(12) United States Patent
Huster

(10) Patent No.: US 8,830,500 B2
(45) Date of Patent: Sep. 9, 2014

(54) PRINT-JOB DISTRIBUTION PROGRAM, A PRINTER PROGRAM AND CORRESPONDING METHODS

(75) Inventor: Karsten Huster, Bad Iburg (DE)

(73) Assignee: Canon Europa N.V, Amstelveen (NL)

( * ) Notice: Subject to any disclaimer, the term of this patent is extended or adjusted under 35 U.S.C. 154(b) by 751 days.

(21) Appl. No.: 12/341,939

(22) Filed: Dec. 22, 2008

(65) Prior Publication Data

US 2009/0168100 A1    Jul. 2, 2009

(30) Foreign Application Priority Data

Dec. 28, 2007   (EP) .................................... 07124159

(51) Int. Cl.
*G06F 3/12* (2006.01)
*G06K 15/00* (2006.01)
*G06F 15/16* (2006.01)

(52) U.S. Cl.
USPC ......... 358/1.15; 358/1.13; 358/1.16; 709/246

(58) Field of Classification Search
CPC .... G06K 15/02; G06F 17/30067; G06F 13/10
USPC ........................ 358/1.13, 1.16, 1.15; 709/246
See application file for complete search history.

(56) References Cited

U.S. PATENT DOCUMENTS

| | | | |
|---|---|---|---|
| 2002/0135797 A1 | 9/2002 | Al-Kazily et al. | |
| 2002/0196460 A1* | 12/2002 | Parry | 358/1.15 |
| 2003/0063309 A1 | 4/2003 | Parry | |
| 2005/0073714 A1 | 4/2005 | Makishima | |
| 2006/0031585 A1* | 2/2006 | Nielsen et al. | 709/246 |
| 2006/0119872 A1* | 6/2006 | Koizumi | 358/1.13 |
| 2007/0121147 A1 | 5/2007 | Corona et al. | |
| 2008/0123130 A1* | 5/2008 | Matsumoto et al. | 358/1.15 |

* cited by examiner

*Primary Examiner* — Douglas Tran
*Assistant Examiner* — Justin Katzwhite
(74) *Attorney, Agent, or Firm* — Canon USA, Inc., I.P. Division

(57) ABSTRACT

A computer-readable storage medium and computer-implemented method of distributing a print-job including receiving, from a printer, a request to send a print job to the printer, converting the print job from a first format to a second format, sending the print job to the printer in the second format, wherein the second format is compatible with the printer, and wherein the second format is selected from a plurality of different formats depending on the identity of the printer from which the request to send a print job was received.

16 Claims, 11 Drawing Sheets

| Printer Name | IP Address | Serial No. | PDL |
|---|---|---|---|
| Printer 1 | 172.18.931.1 | CK01654389 | PCL 5e |
| Printer 2 | 192.168.12.34 | CK73159456 | PS |
| Printer 3 | 66.259.76.136 | CK36985214 | PCL 6 |
| ... | ... | ... | ... |

Fig. 11

PRINT-JOB DISTRIBUTION PROGRAM, A PRINTER PROGRAM AND CORRESPONDING METHODS

BACKGROUND OF THE INVENTION

1. Field of the Invention

The present invention relates to a print-job distribution program, a printer program and corresponding methods.

2. Description of the Related Art

Modern businesses and other organisations often provide communal printers for use by staff over a LAN. Administration of these resources is typically provided through a server, such as a print server for controlling printers. The print server is provided to distribute print jobs arriving from different client terminals operated by different users, and will usually provide a print queue for controlling the order in which print jobs are printed. At the client side, at least one application with a print function is provided and a printer driver is also provided. The printer driver is a printer specific software application provided to convert a print job into a page description language that is understandable by the model of printer that the driver is specific to. In a network in which several different types of printer are provided, a printer driver will typically be provided at each client computer for each different type of printer to be used by the client computer.

A print job, mentioned above, is formed of print content, which contains information concerning the image to be printed, and print attributes, which contain information about how an image is to be printed.

An example of use of the above-described printing system will be described below.

A user has prepared a word-processed document and wishes to print the document. The user selects a print option screen from within menus of his or her word processor. The print option screen provides the user with an interface to set print options identifying which parts of the document the user wishes to print (current page, all pages etc.). At this stage, the user inputs settings to identify the content to be sent to the printer. From the print option screen a further option is provided to set properties of the printer. If the properties option is selected, a driver user interface is displayed, which allows specific printer settings such as finishing settings (stapling, hole punching etc.) or paper source (tray to be used for printing) settings to be made.

Once the user has made his settings and selected print from within the word processor, the print driver processes the print job to produce a print job in a page description language understood by the printer to which the job is to be sent. The print job is sent to the print server, where it enters a queue for forwarding to the printer. When the print job reaches the front of the print queue for the printer, the print server forwards the print job to the printer and the printer prints the output print job.

In this conventional arrangement, each client computer (hereinafter "client") in an office needs to have printer drivers installed for each printer to which the client is to print. If printing at a printer becomes undesirable for any reason (for example intensive use of the printer by other users), a print job cannot generally be re-routed to another printer because different printers may not be configured to receive output jobs according to the same page description language. Therefore, it is necessary to "re-print" the print job from the software application. Further, even if some printers can understand the same page description language, different printer models or setups may support different finishings (hole punching, stapling, etc.) so that there is no guarantee that an output print job sent to one printer will be satisfactorily printed by another printer.

SUMMARY OF THE INVENTION

According to a first aspect of the present invention there is provided a print-job distribution program including reception code which receives, from a printer, a request to send a print job to the printer, conversion code which converts the print job from a first format to a second format, and sending code which sends the print job to the printer in the second format, wherein the second format is compatible with the printer, and wherein the sending code selects the second format from a plurality of different formats depending on an identity of the printer from which the request to send a print job was received.

According to the present invention, when a system is appropriately configured, a user can walk up to his or her choice of printer and print a job without worrying about print job compatibility. The print-job distribution program is able to convert the print job from the first format into an appropriate second format compatible with the printer that the user has selected to use.

BRIEF DESCRIPTION OF THE DRAWINGS

FIG. 11 shows a PDL look-up table.

DESCRIPTION OF THE EXEMPLARY EMBODIMENTS

Figure 1:
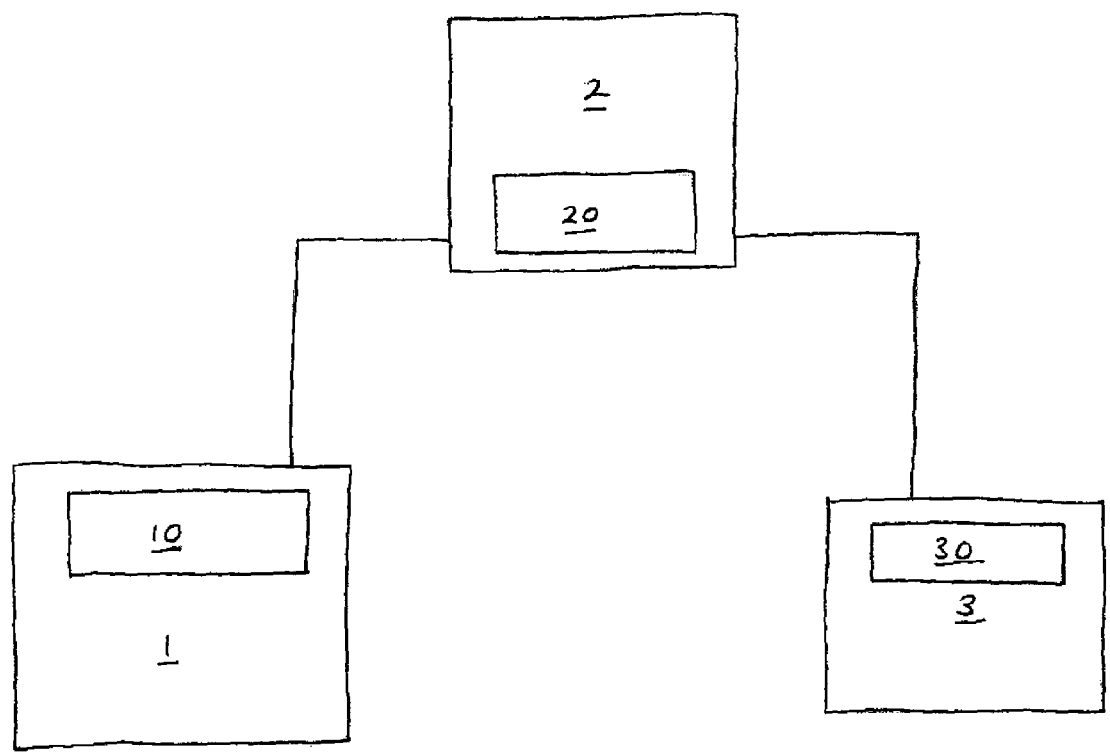
FIG. 1 shows an apparatus of the first embodiment including a client, a server, and a printer.

FIG. 1 shows a printing system including a client 1, a server 2, and a printer 3 connected to each other over a LAN 5. The client 1 is a standard Windows® based PC, the server 2 is a standard Windows® based server, and the printer 3 is a commercially available printer, such as those manufactured by Canon, HP etc. Although not shown in FIG. 1, there are several other printers connected to the LAN 5. Detailed description of these printers is unnecessary for understanding of the embodiments.

Figure 9:
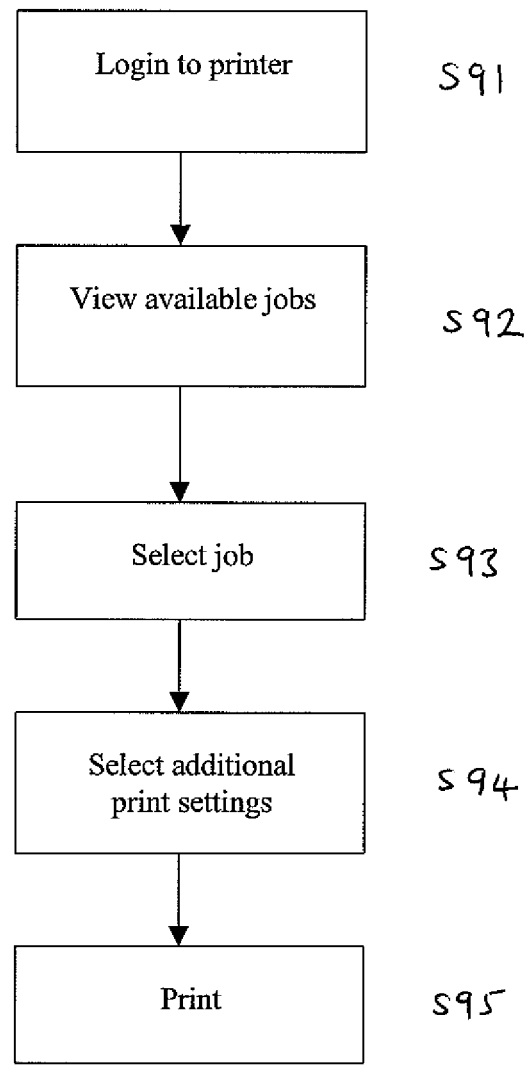
FIG. 9 is a chart showing actions performed when a user prints a job stored by the print manager.

A printer driver 10 is installed on the client 1, and a print-job distribution program (print manager 20) is installed on the client 2. A printer program (applet 30) is installed on the printer 3, the operation of which will be described later with respect to FIG. 9. The printer driver 10 is a postscript printer driver whose operation will be described in more detail below. The print manager 20 is a software application for managing print jobs and has a remote network interface to allow the print manager 20 to be controlled from the client 1.

Figure 2:
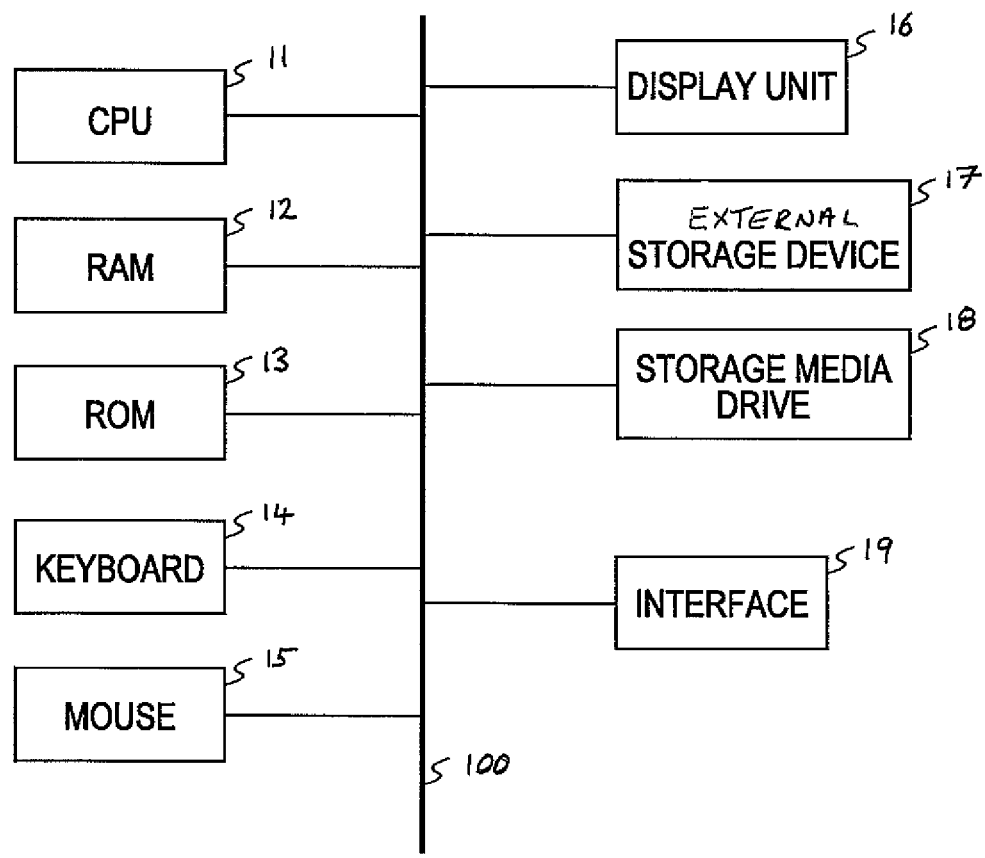
FIG. 2 is a schematic representation of internal structure of the client.

FIG. 2 shows selected standard components that are present in the client 1. The client 1 has a CPU 11, RAM 12, ROM 13, a keyboard 14, a mouse 15, a display unit 16, an external storage device 17, a storage media drive 18, and a network interface 19 connected to each other via a bus 100.

The CPU 11 is a standard processor such as those available from Intel® or AMD®. The RAM (Random Access Memory) 12 is conventional RAM and is used as a temporary storage area for instructions being processed by the CPU 11. The ROM (Read Only Memory) 13 is a memory that stores certain applications for use by the client 1, such as the BIOS. The keyboard 14 and mouse 15 form input devices for the client 1 in a conventional manner. The display unit 16 is a TFT display for providing output display for a user. The external storage device is a removable USB hard disk drive. The storage media drive is a hard disk drive housed in the client 1. Network interface 19 is a set of standard components that allows the client to communicate over the LAN 5.

The printer driver 10 installed on the client 1 is stored in the storage media drive 18, and when launched is processed by the CPU and stored in RAM 12 in order to carry out the steps described below with reference to FIGS. 4 to 6.

The server 2 includes a set of components that are the same as or equivalent to the conventional components described above in connection with the client 1. Description of these components is therefore omitted. The print manager 20 installed on the server 2 is stored on a storage media drive, and when launched is processed by a CPU and stored in RAM in order to carry out the steps described below with reference to FIGS. 7 to 11.

Figure 3:
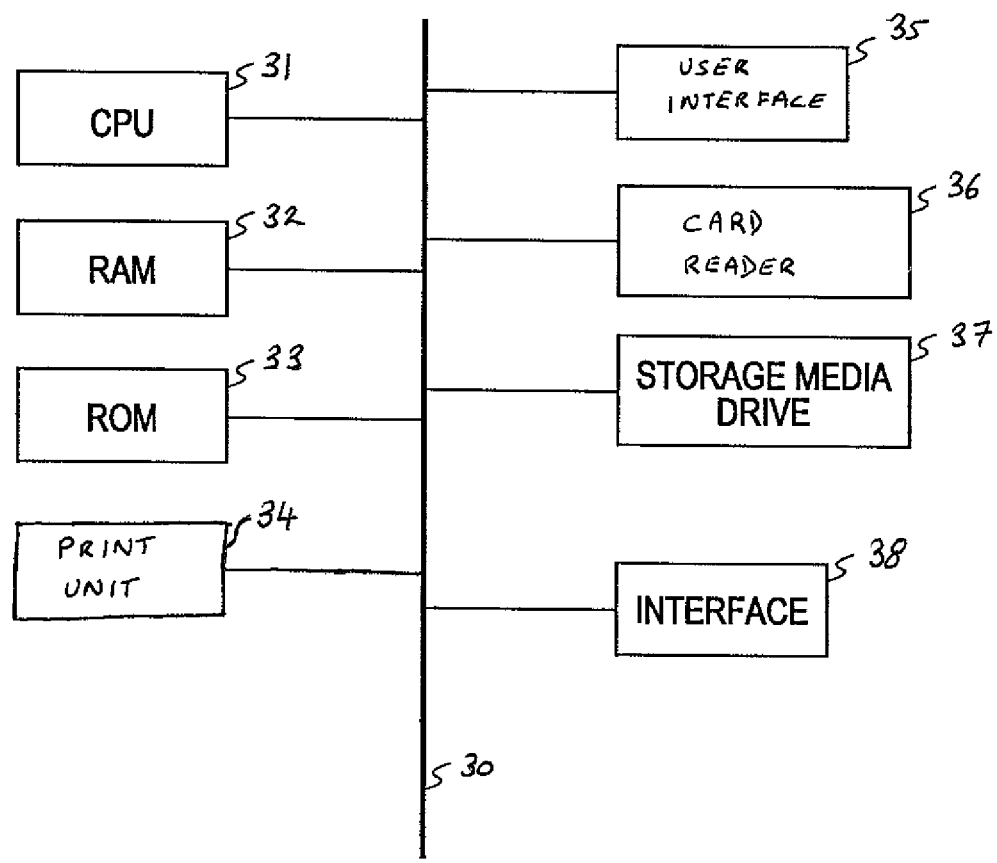
FIG. 3 is a schematic representation of an internal structure of the printer.

FIG. 3 shows parts of the printer 3. The printer 3 includes a CPU 31, RAM 32, ROM 33, a print unit 34, a user interface 35, a card reader 36, a storage media drive 37, and a network interface 38.

The CPU 31 and RAM 32 are standard components that perform their usual functions. The ROM 32 stores software for the printer, such as a printer operating system. The print unit represents components of the printer for printing documents. The user interface 35 is provided to allow entry of settings and display of settings to a user. In this embodiment, the user interface 35 is formed of a series of user operable buttons (hard keys) and a touch-screen display for entry of settings. Card reader 36 is an identity-card reader, which uses RFID technology. Network interface 38 is a set of components that allows the printer 3 to communicate over the LAN 5. The storage media drive 37 stores the applet 30. In use, the applet 30 may be run using the CPU 31 and RAM 32 in order to perform steps described below in connection with FIG. 9.

Operation of the printing system will now be explained with reference to FIGS. 4 to 8.

Figure 4:
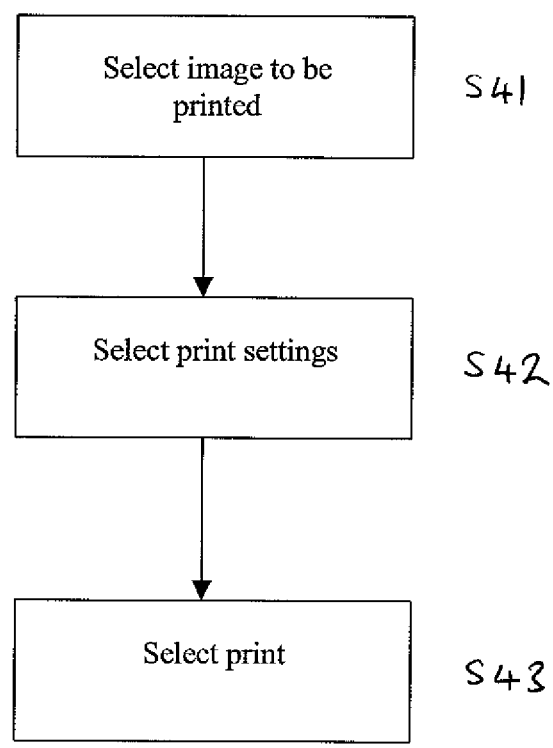
FIG. 4 is a chart showing actions performed by a user printing from a software application.

FIG. 4 shows operations of a user when sending a document for printing. In this example, it is assumed that the user has produced a document using a word-processing application, and, at step S41, the user selects a print option from the word-processing application. The word-processing application provides a screen to allow a user to select the parts of the document to be printed. Once the user has selected the parts of the document to be printed, a printer-driver user interface is displayed. The user then selects print settings for the job in step S42. This step will be described in more detail below in connection with FIG. 5. Once the print settings are entered through a driver user interface, the user issues a print command in step S43.

Figure 5:
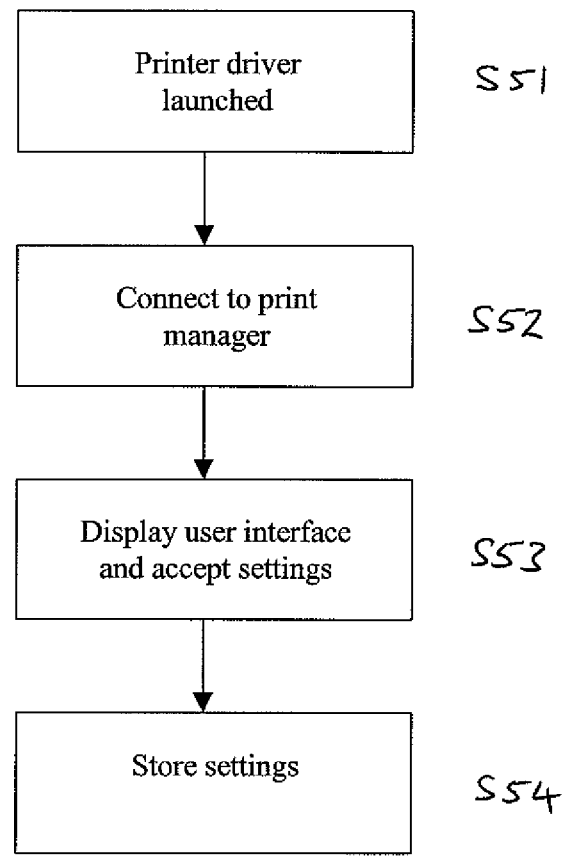
FIG. 5 is a chart showing actions performed during entry of print settings.
Figure 6:
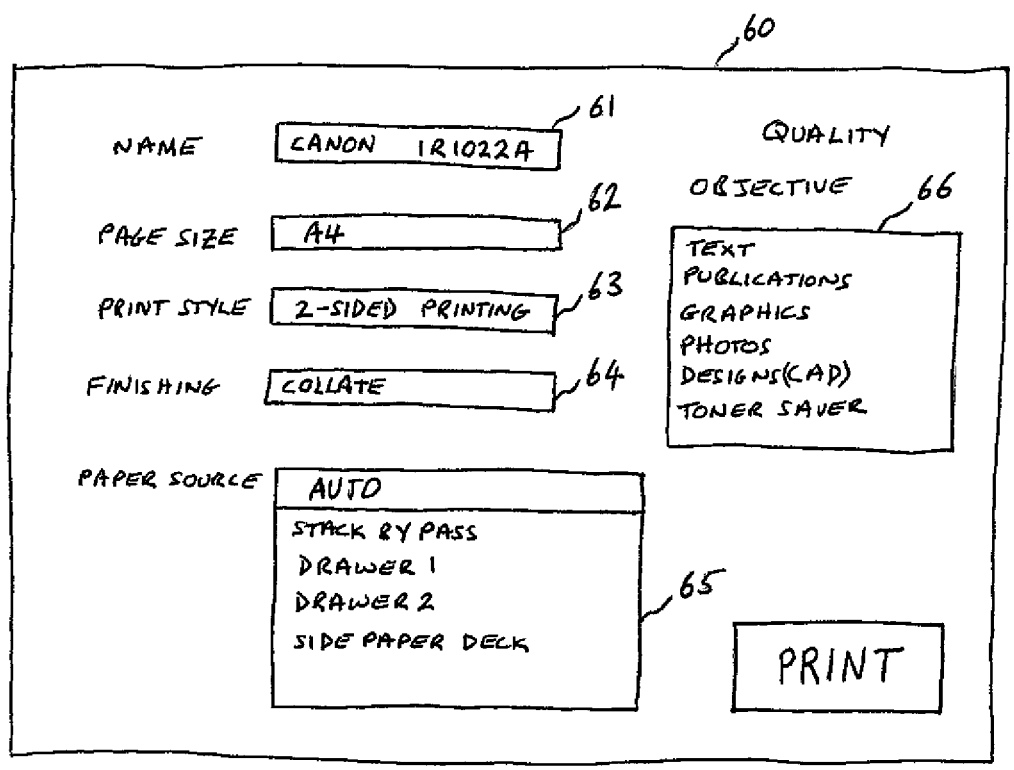
FIG. 6 shows a remote network interface of a print manager.
Figure 7:
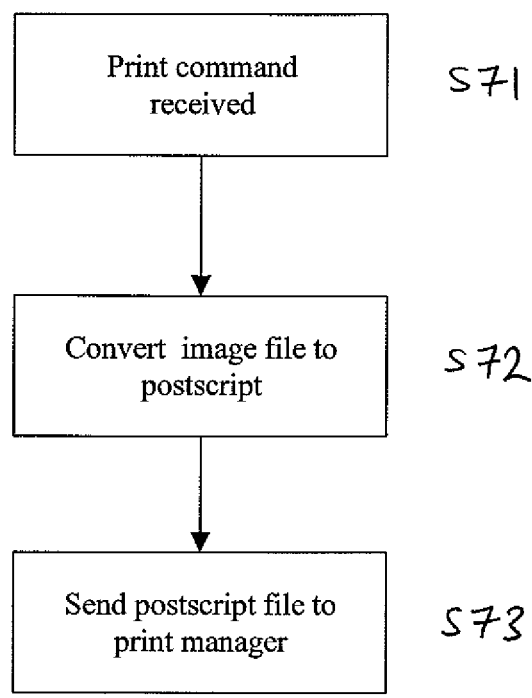
FIG. 7 is a chart showing actions performed by the printer driver after a print command is received.

FIG. 5 shows in more detail steps performed by the user, printer driver 10, and print manager 20 during entry of print settings. When the user issues a command in the word-processing application to enter print settings in step S42, the printer driver 10 is launched in S51. When the printer driver 10 is launched, the printer driver uses the network interface 19 of the client 1 to connect to the print manager 20 on the server 2 in step S52. When a connection has been established, the printer driver 10 receives and displays a remote network interface of the print manager 20. The remote network interface is shown in FIG. 6.

The remote network interface of the print manager 20 includes an interface 60 for entry of print settings. The interface includes a name dropdown menu 61 for selection of the printer to be printed to. The name dropdown menu includes the names of printers available on the network 5 and an option to store the job on the server instead of specifying one of the available printers. A page-size dropdown menu 62 is provided for selection of paper size. The option currently selected is A4. Other options include A3, and envelope sizes. A print-style dropdown menu 63 is provided for selection of single-sided or double-sided printing. A finishing dropdown menu 64 is provided for selection of finishings such as collated tray output, stapled output etc. A paper-source selection window 65 is provided to allow the paper source to be used by the printer 3 to be selected. A quality-setting window 66, which includes a series of quality styles is also provided. The quality styles include text, publications, graphics, photos, designs (CAD), and toner saver styles. If the user selects a quality style, the printer settings are optimised for that type of printing. For example, if photo is selected, the printer settings are optimised for printing photos.

The remote network interface 60 provides options to the user according to a logical scheme so that options that cannot be processed by a printer on the LAN are not selectable. For example, if the printer name is selected, only options available for that printer are displayed. On the other hand, if the printer name is not selected, but stapling is selected under the finishing dropdown menu, only options available on printers capable of stapling are shown.

The print manager is also able to take into account changes in the operating status of printers on the LAN 5 when displaying the network interface. For example, if a printer is unavailable due to a paper jam, selection of printing to the unavailable printer will not be available and options usually available on the unavailable printer will not be displayed unless they are available through some other printer on the network.

Once the user has entered his or her print settings, the print settings and other print attributes such as the identity of the user creating the print job are stored in step S54 on the client 1 or on the server 2 by the print manager 20, or at both locations. The identity of the user may be available from the word-processing application or the operating system of the client 1. In the first embodiment of the present invention, the print settings are stored at the server side with a unique identification number. For the purposes of the following description it will be assumed that the user has selected to store the job on the server 2 rather than to print to a specific printer. The case where a specific printer is selected will be briefly discussed at the end of the description of the first embodiment.

In step S43, described above in connection with FIG. 4, the print command is selected from the word-processing application. At this stage a print command is sent by the word-processing application to the printer driver 10, where it is received at step S71 shown in FIG. 7. After receipt of the print command, the printer driver 10 converts the portion of the document to be printed selected in step S41 into a content file in the form of a postscript file (Step S72). The printer driver then sends the postscript file to the print manager in step S73. The postscript file is sent to the server 2 via LAN 5 along with the unique identification number. It should be noted that the printer driver is configured to output a postscript file in step S72 regardless of the settings entered via the remote network interface 60. Thus the output postscript file is independent of any destination device of the print job.

Figure 8:
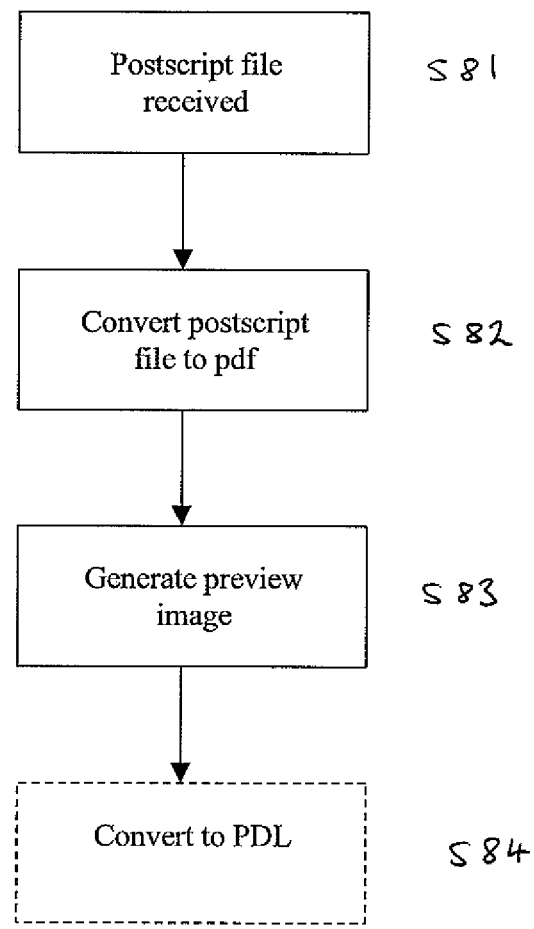
FIG. 8 is a chart showing actions performed by the print manager after receipt of a content file.

FIG. 8 shows operation of the print manager. The postscript file is received from the client 1 at the server 2 in step S81. In this step, the postscript file is stored with the print settings in step S54. The print settings and postscript file are associated or matched with each other using the unique identification number. The postscript file and print settings stored or handled in association with each other are hereinafter referred to as a print job. After receipt of the postscript file, the print manager 20 converts the print job into an Adobe® portable document format file (pdf file). After converting the file to pdf format, the print manager generates some low-resolution preview images.

Optionally, after converting the postscript file to pdf format, a PDL (Page Description Language) file, such as PCL (Printer Command Language) may be created from the pdf file in step S84. By performing this step before a request for printing is received, performance can be improved at a later stage by reducing the number of steps required before printing. This is known as pre-RIPing.

The PDL into which the pdf file is converted may either be a predetermined choice (for example, always convert into PCL 5e or into a group of PDLs) or may be determined based on the PDL used by the printers on the LAN 5. For example, the pdf file could be converted into the PDL used by the majority of the printers on the network 5. Alternatively, the pdf file could be converted into each of the PDLs used by the printers on the network 5.

At this stage the print job is stored on the server 2 in accordance with the setting entered by the user. Retrieval of the print job will now be described with reference to FIG. 9. At step S91, the user logs in to the printer 3. The login in this embodiment is by placing an identity card against the card reader 36 of the printer 3, which logs the user onto the printer 3.

After login, the user is able to view a remote network interface of the print manager 20. A mechanism for viewing a network interface from a printer is described in the Applicant's co-pending application GB 0707496.6. However, other prior art mechanisms may be used, based for example on technologies such as that disclosed in US 2003/0011633. In this embodiment the applet 30 is run on the printer 3. The applet is configured to display a series of panes on the printer's user interface 35. The applet is configured to communicate with the print manager 20 using an XML based communication protocol. More particularly, after launch of the applet 30, a pane is displayed on the user interface 35 showing a list of jobs stored by the print manager 20 in step S92. Associated with each print job on this list is a symbol representing the preview image generated for the print job in step S83. Upon selection of the symbol associated with a print job by a user, the corresponding preview image is downloaded to the printer 3 and is displayed on the user interface 35. In this way, a user can easily identify the content of print jobs displayed by the applet 30. The user selects a job to print or modify in step S93, and in step S94 the applet displays a pane similar in appearance to the remote network interface described above in connection with FIG. 6. The pane displayed shows the current settings for the selected print job in the drop-down menus 61 to 66. In the name drop-down menu 61 the name of the printer 3 that the user is logged onto is displayed. The name drop-down menu 61 is displayed "greyed out" so that this print attribute of the print job cannot be changed. The user is able to vary or add additional print settings to the print job by using the drop-down menus 62 to 66 as before. The options available on the drop-down menus 62 to 66 are limited to those available on the printer 3 that the user has logged onto. If there are print attributes of the selected print job (hereinafter "unprintable attributes") that cannot be correctly printed by the printer 3 that the user is logged onto, these unprintable attributes are displayed in a bolder type face in the drop-down menus compared to the type face in other drop-down menus. In other embodiments, the unprintable attributes may be marked by symbols, highlighted or otherwise identified to the user. In step S95, the user selects the print command from the applet pane. At this stage, the applet checks to see whether all the unprintable attributes have been adjusted i.e. there are no print attributes that are displayed in bold. If there are still unprintable attributes the applet displays a message, "This print job contains attributes that cannot be correctly printed by this printer. Please vary the attributes shown in bold." The user may get rid of this message by selecting an "OK" button on the message and then vary any remaining unprintable attributes. If there are no unprintable attributes in a print job, the selection of the print button causes the applet to send a request to the print manager 20 to send the print job to the printer 3. At the time of requesting the print job, the applet also sends an IP address of the printer 3 on the LAN and a serial number of the printer 3 to the print manager 20.

Figure 10:
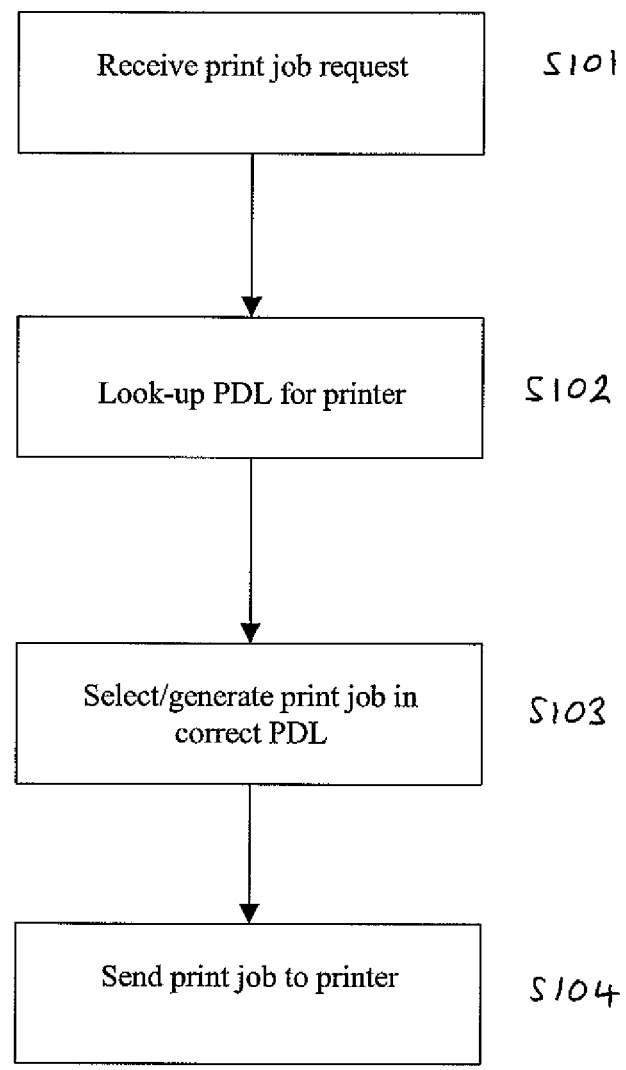
FIG. 10 is a chart showing actions performed by the print manager after receipt of a request to send a print job to the printer.

Referring now to FIG. 10, once the print manager 20 receives the print command in step S101, the print manager 20 determines the appropriate PDL for the printer 3 in step S102. To determine the appropriate PDL, the printer manager 20 refers to a PDL look-up table 11 shown in FIG. 11. The PDL look-up table lists the printers registered in the print manager 20. For each printer, a name is shown in column 111, the IP address of the printer is shown in column 112, the serial number of the printer is shown in column 113, and the appropriate PDL is shown in column 114. In the example above, the printer 3 is "printer 3" in the PDL look-up table 11. In step 102, the print manager determines using the IP address and serial number received from the applet 30 that the appropriate PDL is PCL 6.

In step S103, a print job in the appropriate PDL is either generated by the print manager 20 or selected from the PDL files generated in step S84. In step S103 any appropriate printer specific finishing commands are also added to the print job. After this, in step S104, the print job is queued and sent to the printer 3. Once the printer 3 receives the print job, the print job is printed according to the instructions in the print job and the user may then collect the printed materials.

In the embodiment described above, the print job is converted from PDF into the appropriate PDL in either step S84, before the identity of printer 3 is known to the print manager 20, or in step S103 after a request to send the print job is received at the print manager 20. In other embodiments, the print job may be converted into the appropriate PDL before a request for the print job is sent to the print manager 20 in step S95, but after the user has logged on to the printer 3 in step S91. For example, in parallel with the display of the list of print jobs on the printer 3 in step S92, all the print jobs displayed may be converted into the appropriate PDL for the printer 3. In other embodiments, the conversion of the print job may begin in response to a first communication with the print manager 20 from the printer 3 after the user has logged into the printer 3 in step S91. In some embodiments step S91, the printer may notify the print manager 20 of the identity of the user that has logged on. In such embodiments, the print manager may only allow the user to access print jobs having print attributes in which the user is identified, and may only convert these print jobs into the appropriate PDL.

The above description describes the case where the print job is stored on the server and retrieved by a user logging onto a printer. However, the user may select to print the job directly to the printer from within the print driver 10. In this case, the user selects the printer to be printed to in step S53 (FIG. 5). After the user selects print in step S43, a postscript file is generated and sent to the server 2 as described above. After receipt of the postscript file, print manager 20 performs steps S81, S82, and S83 as described above. However, step S84 is not performed and the pdf file is instead converted into the appropriate PDL for the printer that the user selected to print to. After the print job is converted into the appropriate PDL format, the job is place in a print queue associated with the printer selected by the user, and printed in a conventional manner. In the first embodiment, the print settings were stored at the server 2 in step S54 along with a unique identification number. The printer driver 10 then sent the postscript file to the server 2 with the unique identification number, where the print settings and postscript were stored in association with each other as a print job. In a second embodiment of the present invention, postscript driver 10 stores the print settings and sends them to the print manager 20 with the postscript file.

More particularly, in the second embodiment, after entry of print settings in step S53, the print settings are stored on the client 1 by the printer driver 10. The user then provides a print command to the word processing application in step S71 and the printer driver produces a postscript file in the same manner as in the first embodiment (step S72). In step S73, the printer driver 10 sends both the postscript file and the print settings as a print job to the print manager 20. In step S81, the print manager receives the print job. The remaining steps from step S82 onwards are performed as in the first embodiment, so the description is not repeated here.

The second embodiment avoids the need to generate a unique identification number for each job and to match received postscript files and print settings at the print manager.

A further embodiment provides a print-job distribution program including reception means for receiving, from a printer, a request to send a print job to the printer, conversion means for converting the print job from a first format to a second format, and sending means for sending the print job to the printer in the second format, which second format is compatible with the printer, wherein the sending means is configured to select the second format from a plurality of different formats in dependence upon the identity of the printer from which the request to send a print job was received.

A further embodiment provides a method of distributing a print-job including: receiving, from a printer, a request to send a print job to the printer, converting the print job from a first format to a second format, and sending the print job to the printer in the second format, which second format is compatible with the printer, wherein the second format is selected from a plurality of different formats in dependence upon the identity of the printer from which the request to send a print job was received.

According to the embodiments of the present invention, when a system is appropriately configured, a user can walk up to his or her choice of printer and print a job without worrying about print job compatibility. The print-job distribution program is able to convert the print job from the first format into an appropriate second format compatible with the printer that the user has selected to use.

The conversion means may be configured to convert the print job from the first format into a plurality of jobs in different formats including the print job in the second format, and the sending means may be configured to select the print job in the second format from the plurality of jobs in different formats. The conversion means can be configured to convert the print job in the first format into the plurality of print jobs in different formats prior to receipt of the request to send the print job to the printer. In this way, the print job may be converted from the first format into a plurality of different possible second formats before the user has decided which printer he or she wishes to print from. The pre-conversion of the print job from the first format to the plurality of different formats can save time that would be spent converting the print job after receipt of the request to send the print job, thereby reducing delay in sending the print job to the printer after the receipt of the request to send the print job.

Alternatively, the conversion means may be configured to convert the print job from the first format to the second format in response to a request from the printer and the selection of the second format by the sending means. The request from the printer may be one of the request to send the print job to the printer, a request to access the print-job distribution program from the printer, and a request to view a list of print jobs stored by the print-job distribution program at the printer. In some embodiments an identity of a user that generated the print job is included in the print job. In such embodiments, the print-job distribution program may determine the identity of a user logged into the printer, and may only convert print jobs belonging to the logged-in user to the second format. Such embodiments are advantageous because unnecessary processing time and memory space are not wasted in converting the print job from the first format into a plurality of different formats.

The sending means may be configured to determine the second format based on at least one of a serial number of the printer, and a network address of the printer. The network address may be an IP address of the printer. In some such embodiments, an administrator may configure a look-up table including at least one of the serial number of the printer, and the network address to identify the second format. Such embodiments are easy to administer.

The first format may be a device independent format, which is independent of the printer to which the print job may be sent by the sending means. The first format may be portable document format (PDF). The use of a device independent format is convenient for converting into device specific second formats or page description languages.

The second format may be a device specific format or page description language.

The print-job distribution program may further comprise modification means for modifying a print job in response to a request to modify the print job. This conveniently allows a user to change settings in a print job from the printer.

A further embodiment of the present invention provides a printer program comprising means for requesting a print job from a print-job distribution program of the type described above.

The printer program may comprise means for causing display of a list of print jobs that may be requested from the print-job distribution program. The printer program may comprise means for causing preview images of print jobs that may be requested from the print-job distribution program to be displayed. In such embodiments, a user may easily select a desired print job.

The printer program may further comprise generation means for generating a request to modify a print job, and means for sending a generated request to modify a print job to the print-job distribution program. This conveniently allows a user to change settings in a print job from the printer. In some embodiments, the generation means may be configured to only allow generation of modification requests that would cause a print job to be modified to include print attributes that may be correctly processed by the printer. In this way, a user may be guided to modify print job attributes appropriately for the printer that he or she is currently using.

A further embodiment provides a print management apparatus, comprising means for storing and executing a print-job distribution program of the type described above, and means for storing and executing a printer program of the type described above.

The print-job distribution program and/or a printer program may be stored on a storage medium.

A further embodiment provides a device driver program configured to generate a content file corresponding to content to be processed by a peripheral device of a plurality of peripheral devices which operate according to different protocols, wherein the device driver program is configured to generate a content file that conforms with the same protocol regardless of the protocol that the peripheral device is configured to work with.

In another embodiment there is provided a print-job distribution program configured to receive a plurality of content files that conform with a single protocol, which plurality of content files provide content to be processed by different ones of a plurality of peripheral devices which operate according to different protocols, and to convert the received content files into respective jobs, each respective job conforming with a protocol compatible with the peripheral device to which the job is destined.

In another embodiment there is provided a job-management system including means for storing and executing a device driver program configured to generate a content file corresponding to content to be processed by a peripheral device of a plurality of peripheral devices which operate according to different protocols, wherein the content file conforms with the same protocol regardless of the protocol that the peripheral device is configured to work with, and means for storing and executing a print-job distribution program configured to receive the content file and to convert the received content file into a job conforming with a protocol compatible with the peripheral device to which the job is destined.

Use of a device driver program and a print-job distribution program as described immediately above advantageously allows jobs to be sent to any of a plurality of peripheral devices using a single device driver. In this way, the need to install multiple device drivers on a client is alleviated. Further, because the jobs created by the device driver program and received at the print-job distribution program conform with a common protocol, the print-job distribution program can redirect jobs to another peripheral device without the need for a new job/output file to be created by the device driver program. This can be useful in the event that a destination peripheral device is inoperable for any reason.

The device driver program can be installed on a client and the print-job distribution program can be installed on a server to which the client and peripheral devices are connected.

In some embodiments the content file is a job for a peripheral device including job attributes.

In other embodiments, the content file does not include job attributes. In such embodiments, the print-job distribution program may be configured to combine job attributes with the content file.

The device driver program can be configured to provide an interface for input of job attributes for a job. The device driver program may comprise connection means for initiating a connection with the print-job distribution program manager; and display means for causing an interface with the print-job distribution program to be displayed to allow setting of job attributes.

In this way, job attributes may be entered based on information available to the print-job distribution program. In some embodiments, the interface with the print-job distribution program provides options for entry of job attributes based on capabilities of peripheral devices accessible by the print-job distribution program. The interface with the print-job distribution program may provide options for entry of job attributes depending on the operational status of peripheral devices that the print-job distribution program can access. For example, if a peripheral device is inoperable, perhaps due to paper jam or other failure, finishing options provided by that peripheral device will not be provided to the user unless they are available on some other peripheral device. The interface with the print-job distribution program may display options based on a logical scheme, whereby a user may select only combinations of options that can be completed by a single peripheral device.

In some embodiments, the print-job distribution program may store the entered job attributes in memory accessible by the print-job distribution program. In the case that the print-job distribution program receives an output file, the print-job distribution program may store a received content file from the device driver program with corresponding job attributes stored by the print-job distribution program.

The device driver program and the print-job distribution program can be configured for secure communication. Communication between the device driver program and the print-job distribution program may be secured by encryption or any other conventional means.

The print-job distribution program may be configured to generate preview images based on received content files. In this way, if a user accesses the print-job distribution program after receipt of a content file, the user may view a preview image corresponding to the content file in order to identify his or her content.

In some embodiments, the print-job distribution program may convert a received content file and attributes into a standard file format. The standard file format may be a device independent file format and/or a resolution independent format, such as PDF (portable document format) file format. This conversion may involve raster image processing. In other embodiments such conversion may be unnecessary because the content files and attributes are received according to a single format, which could be used as the standard format.

In some embodiments, the device-driver program may be a printer-driver program. In such cases the job attributes may relate to print finishings such as double sided or single sided printing, stapling etc.

Another embodiment provides a job-processing method including the steps of generating a content file corresponding to content to be processed by a peripheral device of a plurality of peripheral devices which operate according to different protocols, wherein the content file conforms with the same protocol regardless of the protocol that the peripheral device is configured to work with.

Another embodiment provides a job-processing method includes the steps of receiving a plurality of content files that conform with a single protocol, which plurality of content files correspond to content to be processed by at least one of a plurality of peripheral devices, and converting the received content files into jobs, each of which conforms with a protocol compatible with the peripheral device to which the job is destined.

Another embodiment provides a printer driver including generating means for generating a content file conforming with the same protocol regardless of an operating protocol of a peripheral device by which the content file may be processed.

A device driver program can be provided for use in sending jobs to any of a plurality of peripheral devices, wherein the device driver program generates output in the same protocol regardless of the peripheral device to which the output relates.

Another embodiment provides a device driver program for setting attributes in connection with a job, including connection means for initiating a connection with a server, and display means for displaying an interface with an application on the server.

The interface with the application on the server can allow setting of job attributes.

This application claims priority from European patent application no. 07124159.0 filed on 28 Dec. 2007, which is hereby incorporated by reference in its entirety.

What is claimed is:

1. A non-transitory computer-readable storage medium storing a print-job distribution program comprising:
reception code which receives, from a designated printer, a request to send a print job to the designated printer, and the designated printer is selected from a group of at least two printers by logging a user into the designated printer;
conversion code which converts the print job from a first print format to a page description language as a second print format, wherein the first print format is independent of the designated printer to which the print job may be sent; and
sending code which sends the print job to the designated printer in the second print format, wherein the second print format is compatible with the designated printer, and wherein the sending code selects the second print format from a plurality of different print formats depending on an identity of the designated printer from which the request to send the print job was received.

2. The non-transitory computer-readable storage medium according to claim 1, wherein the conversion code converts the print job from the first print format into a plurality of print jobs in different print formats including the print job in the second print format, and the sending code selects the print job in the second print format from the plurality of print jobs in different print formats.

3. The non-transitory computer-readable storage medium according to claim 2, wherein the conversion code converts the print job in the first print format into the plurality of print jobs in different print formats prior to receipt of the request to send the print job to the designated printer.

4. The non-transitory computer-readable storage medium according to claim 1, wherein the conversion code converts the print job from the first print format to the second print format in response to a request from the designated printer and the selection of the second print format by the sending code.

5. The non-transitory computer-readable storage medium according to claim 4, wherein the request from the designated printer is one of a request to send the print job to the designated printer, a request to access the print-job distribution program from the designated printer, and a request to view a list of print jobs stored by the print-job distribution program at the designated printer.

6. The non-transitory computer-readable storage medium according to claim 1, wherein the sending code selects the second print format based on at least one of a serial number of the designated printer and a network address of the designated printer.

7. The non-transitory computer-readable storage medium according to claim 1, wherein the first print format is portable document format.

8. The non-transitory computer-readable storage medium according to claim 1, wherein the print-job distribution program further comprises a modifying code which modifies the print job in response to a request to modify the print job.

9. A non-transitory computer-readable storage medium storing a printer program which requests a print job from a print-job distribution program, and a computer-readable storage medium storing print-job distribution program, the print-job distribution program comprising:
reception code which receives, from a designated printer, of a request to send a print job to the designated printer, and the designated printer is selected from a group of at least two printers by logging a user into the designated printer;
conversion code which converts the print job from a first print format to a page description language as a second print format, wherein the first print format is independent of the designated printer to which the print job may be sent; and
sending code which sends the print job to the designated printer in the second print format, wherein the second print format is compatible with the designated printer, and wherein the sending code portion selects the second print format from a plurality of different print formats depending on an identity of the designated printer from which the request to send the print job was received.

10. The non-transitory computer-readable storage medium according to claim 9, wherein the printer program comprises a code for causing display of a list of print jobs that may be requested from the print-job distribution program.

11. The non-transitory computer-readable storage medium according to claim 9, wherein the printer program comprises a generating code which generates a request to modify the print job, and a sending code which sends a generated request to modify the print job to the print-job distribution program.

12. The non-transitory computer-readable storage medium according to claim 11, wherein the generating code of the printer program only allows generation of modification requests that would cause the print job to be modified to include print attributes that may be correctly processed by the designated printer.

13. A print management apparatus, comprising the computer-readable storage medium according to claim 9.

14. A computer-implemented method of distributing a print-job comprising:
receiving, from a designated printer, a request to send a print job to the designated printer, and the designated printer is selected from a group of at least two printers by logging a user into the designated printer;

converting the print job from a first print format to a page description language as a second print format, wherein the first print format is independent of the designated printer to which the print job may be sent; and sending the print job to the designated printer in the second print format, wherein the second print format is compatible with the designated printer, and wherein the second print format is selected from a plurality of different print formats depending on the identity of the designated printer from which the request to send the print job was received.

15. A non-transitory computer-readable storage medium storing a print-job distribution program comprising:

reception means for receiving, from a designated printer, a request to send a print job to the designated printer, and the designated printer is selected from a group of at least two printers by logging a user into the designated printer;

conversion means for converting the print job from a first print format to a page description language as a second print format; and sending means for sending the print job to the designated printer in the second print format, wherein the second print format is compatible with the designated printer, and wherein the sending means is configured to select the second print format from a plurality of different print formats depending on an identity of the designated printer from which the request to send the print job was received.

16. A non-transitory computer-readable storage medium storing a print-job distribution program comprising:

reception code which receives, from a designated printer, a request to send a print job to the designated printer, and the designated printer is selected from a group of at least two printers by logging a user into the designated printer;

conversion code which converts the print job from a first print format to a page description language as a second print format, wherein the first print format is independent of the designated printer to which the print job may be sent; and sending code which sends the print job to the designated printer in the second print format, wherein the second print format is compatible with the designated printer, and wherein the sending code selects the second print format from a plurality of different print formats depending on the identity of the designated printer from which the request to send the print job was received, and wherein the conversion code converts the print job from the first print format into a plurality of print jobs in different print formats including the print job in the second print format prior to receipt of the request to send the print job to the designated printer, and wherein the sending code selects the print job in the second print format from the plurality of print jobs in different print formats.

* * * * *